(12) United States Patent
Bai et al.

(10) Patent No.: US 7,439,000 B2
(45) Date of Patent: Oct. 21, 2008

(54) HIGH CLARITY CHOLESTERIC LIQUID CRYSTAL FILMS

(75) Inventors: Feng Bai, Woodbury, MN (US); Marc D. Radcliffe, Newport, MN (US); Aaron D. Montello, New Richmond, WI (US); Jianhui Xia, Woodbury, MN (US); Domasius Nwabunma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 370 days.

(21) Appl. No.: 11/257,844

(22) Filed: Oct. 25, 2005

(65) Prior Publication Data

US 2007/0090326 A1    Apr. 26, 2007

(51) Int. Cl.
*C09K 19/00* (2006.01)
*C09K 19/52* (2006.01)
*G02F 1/03* (2006.01)

(52) U.S. Cl. .................. 430/20; 430/270.1; 428/1.1; 428/1.2; 252/299.01

(58) Field of Classification Search .................. 430/20, 430/270.1; 252/299.01; 428/1.1, 1.2
See application file for complete search history.

(56) References Cited

U.S. PATENT DOCUMENTS

| | | | |
|---|---|---|---|
| 3,279,320 A | 10/1966 | Rosebrock | |
| 3,661,744 A | 5/1972 | Kehr et al. | |
| 4,289,867 A | 9/1981 | Martin | |
| 4,293,435 A | 10/1981 | Portugall et al. | |
| 4,974,941 A | 12/1990 | Gibbons et al. | |
| 5,032,009 A | 7/1991 | Gibbons et al. | |
| 5,332,522 A | 7/1994 | Chen et al. | |
| 5,360,659 A | 11/1994 | Arends et al. | |
| 5,389,698 A | 2/1995 | Chigrinov et al. | |
| 5,602,661 A | 2/1997 | Schadt et al. | |
| 5,744,057 A | 4/1998 | Meyer et al. | |
| 5,780,629 A | 7/1998 | Etzbach et al. | |
| 5,838,407 A | 11/1998 | Chigrinov et al. | |
| 5,847,068 A | 12/1998 | Maxein et al. | |
| 5,886,242 A | 3/1999 | Etzbach et al. | |
| 5,958,293 A | 9/1999 | Gibbons et al. | |
| 6,034,813 A | 3/2000 | Woodard et al. | |
| 6,049,419 A | 4/2000 | Wheatley et al. | |
| 6,207,260 B1 | 3/2001 | Wheatley et al. | |
| 6,368,699 B1 | 4/2002 | Gilbert et al. | |
| 6,565,982 B1 | 5/2003 | Ouderkirk et al. | |
| 6,574,045 B2 | 6/2003 | Hebrink et al. | |
| 6,663,950 B2 | 12/2003 | Barth et al. | |
| 6,667,095 B2 | 12/2003 | Wheatley et al. | |
| 6,737,154 B2 | 5/2004 | Jonza et al. | |
| 7,160,586 B2 * | 1/2007 | Radcliffe et al. | 428/1.3 |
| 2004/0004778 A1 | 1/2004 | Liu et al. | |
| 2004/0032658 A1 | 2/2004 | Fleming | |
| 2004/0033675 A1 | 2/2004 | Fleming et al. | |
| 2004/0165140 A1 | 8/2004 | Pokorny et al. | |
| 2005/0045854 A1 | 3/2005 | Radcliffe et al. | |
| 2005/0266158 A1 | 12/2005 | Pokorny et al. | |

FOREIGN PATENT DOCUMENTS

| | | |
|---|---|---|
| EP | 1350618 | 10/2003 |
| EP | 0834754 | 12/2004 |
| JP | 02171720 A * | 7/1990 |
| JP | 13172342 A | 6/2001 |
| JP | 13323125 A | 11/2001 |
| WO | 2004000549 | 12/2003 |
| WO | WO 2005023964 A2 | 3/2005 |

* cited by examiner

*Primary Examiner*—Geraldina Visconti
(74) *Attorney, Agent, or Firm*—Jeffrey M. Olofson

(57) ABSTRACT

Cholesteric liquid crystal compositions are disclosed that produce high clarity cholesteric liquid crystal films. The cholesteric liquid crystal compositions are a reaction product of a cholesteric liquid crystal compound of formula (I)

$$R-R_1-R_2-(R_3R_4)_n-R_5-R_6 \qquad (I)$$

as defined herein, and a thiol compound.

20 Claims, No Drawings

HIGH CLARITY CHOLESTERIC LIQUID CRYSTAL FILMS

BACKGROUND

The disclosure generally relates to cholesteric liquid crystal compositions for forming high clarity cholesteric liquid crystal films and optical bodies such as solar control films, and particularly relates to additives for inclusion in cholesteric liquid crystal compositions.

Cholesteric liquid crystal coatings have been developed for use in displays, temperature indicators, as well as other applications. Cholesteric liquid crystal coatings can preferentially reflect light of a particular wavelength having one polarization and transmit light of the opposite or orthogonal polarization. Cholesteric liquid crystal coatings preferably transmit and reflect light without absorbing relatively large amounts of the light.

Dyed and vacuum-coated plastic films have been applied to windows to reduce heat load due to sunlight. To reduce heat load, solar transmission is blocked in either the visible or the infrared portions of the solar spectrum (i.e., at wavelengths ranging from 400 nm to 2500 nm or greater.) Cholesteric liquid crystal films can be used for such applications, however, they often possess high haze values that limit its usefulness for solar control. There is a need for improved light reflecting film or solar control film that has a high visible light transmission, low haze, and blocks radiation.

SUMMARY

The present disclosure relates generally to cholesteric liquid crystal film. The present disclosure more particularly relates to high clarity cholesteric liquid crystal films.

In one embodiment cholesteric liquid crystal compositions are disclosed that produce high clarity cholesteric liquid crystal films. The cholesteric liquid crystal compositions are a reaction product of a cholesteric liquid crystal compound of formula (I)

$$R-R_1-R_2-(R_3R_4)_n-R_5-R_6 \quad (I)$$

and a thiol compound. Formula (I) is defined by n is 1, 2, 3, or 4; R is an acrylate, methacrylate, or acrylamide; $R_1$ is a ($C_1$-$C_8$) alkylene, ($C_2$-$C_8$) alkenylene, or ($C_2$-$C_8$) alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, ($C_1$-$C_8$) alkylene, ($C_2$-$C_8$) alkenylene, ($C_2$-$C_8$) alkylyne, carbonyl, —O—, —C(O)O—, —O(O)C—, —OC(O)O—, —C(O)N—, —CH=N—, —N=CH—, or —NC(O)—; $R_3$ and $R_4$ are independently selected for each n; $R_5$ is a bond, cycloalkylene, cycloalkenylene, hetrocyclylene, arylene, or hetroarylene; and $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

In another embodiment, a method of forming a cholesteric liquid crystal film includes reacting a cholesteric liquid crystal compound and a thiol compound to form a cholesteric liquid crystal polymer. The cholesteric liquid crystal compound includes a compound of formula (I) as described above. The cholesteric liquid crystal polymer is disposed on a substrate and aligned to form an aligned cholesteric liquid crystal film.

Yet other embodiments include a cholesteric liquid crystal film having a visible light transparent substrate including a polymer, and a cholesteric liquid crystal layer disposed on the substrate. The substrate and cholesteric liquid crystal layer have a combined haze value of less than 4% and the cholesteric liquid crystal layer includes a reaction product of a cholesteric liquid crystal compound of formula (I) as described above, and a thiol compound.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to a composition containing "a layer" encompasses embodiments having one, two or more layers. As used in this specification and the appended claims, the term "or" is generally employed in its sense including "and/or" unless the content clearly dictates otherwise.

The term "pressure-sensitive adhesive" or "PSA" refers to a viscoelastic material that possesses the following properties: (1) aggressive and permanent tack, (2) adherence with no more than finger pressure, (3) sufficient ability to hold onto a substrate, and (4) sufficient cohesive strength to be removed cleanly from the substrate.

The term "polymer" will be understood to include polymers, copolymers (e.g., polymers formed using two or more different monomers), oligomers and combinations thereof, as well as polymers, oligomers, or copolymers. Both block and random copolymers are included, unless indicated otherwise.

The term "layer" will be understood to include a single physical thickness or a single optical thickness. A single physical thickness can include a distinct boundary layer or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients The term "polymeric material" will be understood to include polymers, as defined above, and other organic or inorganic additives, such as, for example, antioxidants, stabilizers, antiozonants, plasticizers, dyes, and pigments.

The term "cholesteric liquid crystal composition" refers to a composition including, but not limited to, a cholesteric liquid crystal compound, a cholesteric liquid crystal polymer or a cholesteric liquid crystal precursor such as, for example, lower molecular weight cholesteric liquid crystal compounds including monomers and oligomers that can be reacted to form a cholesteric liquid crystal polymer.

The term a "mixture" refers to an association of heterogeneous substances that may or may not be uniformly dispersed including, for example, a solution, dispersion and the like.

The term a "chiral" unit refers to an asymmetrical unit that does not posses a mirror plane. A chiral unit is capable of rotating a plane of polarization of light to either the left or the right in a circular direction.

The term a "mesogenic" unit refers to a unit having a geometrical structure that facilitates the formation of a liquid crystal mesophase.

The term a "nematic" liquid crystal compound refers to a liquid crystal compound that forms a nematic liquid crystal phase.

The term "solvent" refers to a substance that is capable of at least partially dissolving another substance (solute) to form a solution or dispersion. A "solvent" may be a mixture of one or more substances.

The term "chiral material" refers to chiral compounds or compositions, including chiral liquid crystal compounds and chiral non-liquid crystal compounds that can form or induce a cholesteric liquid crystal mesophase in combination with other liquid crystal material.

The term "polarization" refers to plane polarization, circular polarization, elliptical polarization, or any other nonrandom polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

As used herein, the term "alkyl" refers to a straight or branched or cyclic chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, amino, alkyl substituted amino, or halo, for example. Examples of "alkyl" as used herein include, but are not limited to, methyl, ethyl, n-propyl, n-butyl, n-pentyl, isobutyl, and isopropyl, and the like.

As used herein, the term "alkylene" refers to a straight or branched or cyclic chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched or cyclic chain divalent hydrocarbon radical having one or more carbon—carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched or cyclic chain divalent hydrocarbon radical having one or more carbon—carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, amino, alkyl substituted amino, or halo, for example.

As used herein, "cycloalkyl" refers to an alicyclic hydrocarbon group. Cycloalkyl groups generally include those with three to twelve carbon atoms. Cycloalkyl groups may be unsubstituted or substituted with those substituents that do not interfere with the specified function of the composition. Substituents include alkoxy, hydroxy, amino, alkyl substituted amino, or halo, for example. Such a cycloalkyl ring may be optionally fused to one or more of another heterocyclic ring(s), heteroaryl ring(s), aryl ring(s), cycloalkenyl ring(s), or cycloalkyl rings. Examples of "cycloalkyl" as used herein include, but are not limited to, cyclopropyl, cyclobutyl, cyclopentyl, cyclohexyl, cycloheptyl, or cyclooctyl, and the like.

As used herein, the term "cycloalkenyl" refers to an alicyclic monovalent hydrocarbon radical having at least one carbon double bond in the ring system. Cycloalkenyl groups generally include those with three to twelve carbon atoms. Cycloalkenyl groups may be unsubstituted or substituted with those substituents that do not interfere with the specified function of the composition. Substituents include alkoxy, hydroxy, amino, alkyl substituted amino, or halo, for example. Such a cycloalkenyl ring may be optionally fused to one or more of another heterocyclic ring(s), heteroaryl ring(s), aryl ring(s), cycloalkenyl ring(s), or cycloalkyl rings. Examples of "cycloalkenyl" as used herein include, but are not limited to, cyclopentenyl, cyclohexenyl, and the like.

As used herein, the term "cycloalkylene" refers to an alicyclic divalent hydrocarbon radical. Cycloalkylene groups generally include those with three to twelve carbon atoms. Cycloalkylene groups may be unsubstituted or substituted with those substituents that do not interfere with the specified function of the composition. Substituents include alkoxy, hydroxy, amino, alkyl substituted amino, or halo, for example. Such a cycloalkylene ring may be optionally fused to one or more of another heterocyclic ring(s), heteroaryl ring(s), aryl ring(s), cycloalkenyl ring(s), or cycloalkyl rings. Examples of "cycloalkylene" as used herein include, but are not limited to, cyclopropyl-11-diyl, cyclopropyl-1,2-diyl, cyclobutyl-1,2-diyl, cyclopentyl-1,3-diyl, cyclohexyl-1,2-diyl, cyclohexyl-1,3-diyl cyclohexyl-1,4-diyl, cycloheptyl-1,4-diyl, or cyclooctyl-1,5-diyl, and the like.

As used herein, the term "cycloalkenylene" refers to a substituted alicyclic divalent hydrocarbon radical having at least one carbon—carbon double bond in the ring system. Cycloalkenylene groups generally include those with three to twelve carbon atoms. Cycloalkenylene groups may be unsubstituted or substituted with those substituents that do not interfere with the specified function of the composition. Substituents include alkoxy, hydroxy, amino, alkyl substituted amino, or halo, for example. Such a cycloalkenylene ring may be optionally fused to one or more of another heterocyclic ring(s), heteroaryl ring(s), aryl ring(s), cycloalkenyl ring(s), or cycloalkyl rings. Examples of "cycloalkenylene" as used herein include, but are not limited to, 4,5-cyclopentene-1,3-diyl, 4,5-cyclohexene-1,2-diyl, and the like.

As used herein, the term "heterocyclic" or the term "heterocyclyl" refers to a monovalent three to twelve-membered non-aromatic ring containing one or more heteroatomic substitutions independently selected from S, O, or N and having zero to five degrees of unsaturation. Heterocyclyl groups may be unsubstituted or substituted with those substituents that do not interfere with the specified function of the composition. Substituents include alkoxy, hydroxy, amino, alkyl substituted amino, or halo, for example. Such a heterocyclic ring may be optionally fused to one or more of another heterocyclic ring(s), heteroaryl ring(s), aryl ring(s), cycloalkenyl ring(s), or cycloalkyl rings. Examples of "heterocyclic" as used herein include, but are not limited to, tetrahydrofuryl, pyranyl, 1,4-dioxanyl, 1,3-dioxanyl, piperidinyl, pyrrolidinyl, morpholinyl, tetrahydrothiopyranyl, tetrahydrothiophenyl, and the like.

As used herein, the term "heterocyclylene" refers to a divalent three to twelve membered non-aromatic heterocyclic ring radical containing one or more heteroatoms independently selected from S, O, or N and having zero to five degrees of unsaturation. Heterocyclylene groups may be unsubstituted or substituted with those substituents that do not interfere with the specified function of the composition. Substituents include alkoxy, hydroxy, amino, alkyl substituted amino, or halo, for example. Such a heterocyclylene ring may be optionally fused to one or more of another heterocyclic ring(s), heteroaryl ring(s), aryl ring(s), cycloalkenyl ring(s), or cycloalkyl rings. Examples of "heterocydylene" as used herein include, but are not limited to, tetrahydrofuran-2,5-diyl, morpholine-2,3-diyl, pyran-2,4-diyl, 1,4-dioxane-2,3-diyl, 1,3-dioxane-2,4-diyl, piperidine-2,4-diyl, piperidine-1, 4-diyl, pyrrolidine-1,3-diyl, morpholine-2,4-diyl, and the like.

As used herein, the term "aryl" refers to monovalent unsaturated aromatic carbocyclic radicals having a single ring, such as phenyl, or multiple condensed rings, such as naphthyl or anthryl. Aryl groups may be unsubstituted or substituted with those substituents that do not interfere with the specified function of the composition. Substituents include alkoxy, hydroxy, amino, alkyl substituted amino, or halo, for example. Such an aryl ring may be optionally fused to one or more of another heterocyclic ring(s), heteroaryl ring(s), aryl ring(s), cycloalkenyl ring(s), or cycloalkyl rings. Examples of "aryl" as used herein include, but are not limited to, phenyl, 2-naphthyl, 1-naphthyl, biphenyl, 2-hydroxyphenyl, 2-aminophenyl, 2-methoxyphenyl and the like.

As used herein, the term "arylene" refers to divalent unsaturated aromatic carbocyclic radicals having a single ring, such as phenylene, or multiple condensed rings, such as naphthylene or anthrylene. Arylene groups may be unsubstituted or substituted with those substituents that do not interfere with the specified function of the composition. Substituents include alkoxy, hydroxy, amino, alkyl substituted amino, or halo, for example. Such an "arylene" ring may be optionally fused to one or more of another heterocyclic ring(s), heteroaryl ring(s), aryl ring(s), cycloalkenyl ring(s), or cycloalkyl rings. Examples of "arylene" as used herein include, but are not limited to, benzene-1,2-diyl, benzene-1, 3-diyl, benzene-1,4-diyl, naphthalene-1,8-diyl, anthracene-1,4-diyl, and the like.

As used herein, the term "heteroaryl" refers to a monovalent five-to seven-membered aromatic ring radical containing one or more heteroatoms independently selected from S, O, or N. Heteroaryl groups may be unsubstituted or substituted with those substituents that do not interfere with the specified function of the composition. Substituents include alkoxy, hydroxy, amino, alkyl substituted amino, or halo, for example. Such a "heteroaryl" ring may be optionally fused to one or more of another heterocyclic ring(s), heteroaryl ring(s), aryl ring(s), cycloalkenyl ring(s), or cycloalkyl rings.

Examples of "heteroaryl" used herein include, but are not limited to, furyl, thiophenyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl, pyridazinyl, pyrazinyl, pyrimidinyl, quinolinyl, isoquinolinyl, benzofuryl, benzothiophenyl, indolyl, and indazolyl, and the like.

As used herein, the term "heteroarylene" refers to a divalent five-to seven-membered aromatic ring radical containing one or more heteroatoms independently selected from S, O, or N. Heteroarylene groups may be unsubstituted or substituted with those substituents that do not interfere with the specified function of the composition. Substituents include alkoxy, hydroxy, amino, alkyl substituted amino, or halo, for example. Such a "heteroarylene" ring may be optionally fused to one or more of another heterocyclic ring(s), heteroaryl ring(s), aryl ring(s), cycloalkenyl ring(s), or cycloalkyl rings. Examples of "heteroarylene" used herein include, but are not limited to, furan-2,5-diyl, thiophene-2,4-diyl, 1,3,4-oxadiazole-2,5-diyl, 1,3,4-thiadiazole-2,5-diyl, 1,3-thiazole-2,4-diyl, 1,3-thiazole-2,5-diyl, pyridine-2,4-diyl, pyridine-2,3-diyl, pyridine 2,5-diyl, pyrimidine-2,4-diyl, quinoline-2,3-diyl, and the like.

As used herein, the term "halogen" or "halo" shall include iodine, bromine, chlorine and fluorine.

As used herein, the term "hydroxy" refers to the substituent —OH.

A used herein, the term "amino" refers to the substituent —NH$_2$.

Reflective polarizers preferentially reflect light of one polarization and preferentially transmit the remaining light. In the case of circular reflective polarizers, light circularly polarized in one sense, which may be the clockwise or counterclockwise sense (also referred to as right or left circular polarization), is preferentially transmitted and light polarized in the opposite sense is preferentially reflected. One type of circular polarizer includes cholesteric liquid crystal polarizers.

The present disclosure relates generally to cholesteric liquid crystal films. The present disclosure more particularly relates to high clarity cholesteric liquid crystal films. The high clarity cholesteric liquid crystal films described below are believed to be applicable to a variety of applications needing light reflection, for example, architectural and/or transportation solar control applications. These examples, and the examples discussed below, provide an appreciation of the applicability of the disclosed high clarity light reflecting article, but should not be interpreted in a limiting sense.

Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360°. In many embodiments, this distance is 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For light propagating along the helical axis, Bragg reflection generally occurs when the wavelength, $\lambda$, is in the following range $$n_o p < \lambda < n_e p$$

where p is the pitch and $n_o$ and $n_e$ are the principal refractive indices of the cholesteric liquid crystal material. For example, the pitch can be selected such that the Bragg reflection is peaked in the visible, ultraviolet, or infrared wavelength regimes of light. In many embodiments, the pitch is selected such that the Bragg reflection is peaked in at least the infrared wavelength regime of light.

Cholesteric liquid crystal compounds, including cholesteric liquid crystal polymers, are generally known and typically any of these materials can be used to make optical bodies. Cholesteric liquid crystal polymers are described in U.S. Pat. Nos. 4,293,435 and 5,332,522, 5,886,242, 5,847,068, 5,780,629, 5,744,057 all of which are incorporated herein by reference.

In many embodiments, the cholesteric liquid crystal compound includes a compound of formula (I):

where, n is 1, 2, 3, or 4; R is an acrylate, methacrylate, or acrylamide; $R_1$ is a ($C_1$-$C_8$) alkylene, ($C_2$-$C_8$) alkenylene, or ($C_2$-$C_8$) alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, ($C_1$-$C_8$) alkylene, ($C_2$-$C_8$) alkenylene, ($C_2$-$C_8$) alkylyne, carbonyl, —O—, —C(O)O—, —O(O)C—, —OC(O)O—, —C(O)N—, —CH=N—, —N=CH—, or —NC(O)—; $R_3$ and $R_4$ are independently selected for each n; $R_5$ is a bond, cycloalkylene, cycloalkenylene, hetrocyclylene, arylene, or hetroarylene; $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

In some embodiments, the cholesteric liquid crystal compound includes a compound of formula (I):

where, n is 1 or 2; R is an acrylate or methacrylate, $R_1$ is a ($C_1$-$C_6$) alkylene; $R_2$ is a bond or —O—; $R_3$ is an arylene or hetroarylene; $R_4$ is a bond, ($C_1$-$C_8$) alkylene, —O—, —C(O)O—, —O(O)C—, —OC(O)O—, —C(O)N—; $R_3$ and $R_4$ are independently selected for each n; $R_5$ is a bond, arylene, or hetroarylene; and $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

One example of a cholesteric liquid crystal acrylate is a compound of formula C2:

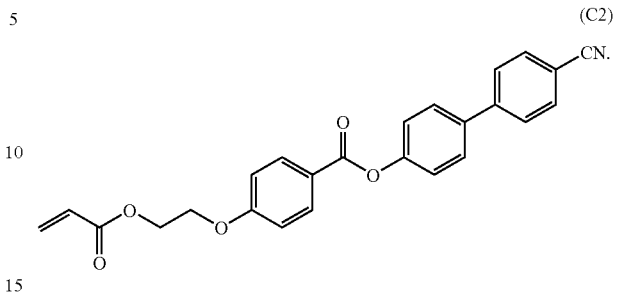

Formula C2 can be prepared as described in EP 834754. An example of commercially available achiral molecular unit is Paliocolor LC242, available from BASF, Charlotte, N.C. An example of commercially available chiral molecular unit is Paliocolor LC756, available from BASF, Charlotte, N.C. However, other cholesteric liquid crystal compounds and precursors not disclosed therein can also be utilized in compositions.

Other cholesteric liquid crystal compounds can also be used. A cholesteric liquid crystal compound may be selected for a particular application or optical body based on one or more factors including, for example, refractive indices, surface energy, pitch, process-ability, clarity, color, low absorption in the wavelength of interest, compatibility with other components (e.g., a nematic liquid crystal compound), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are generally formed using chiral (or a mixture of chiral and achiral) molecules (including monomers) that can include a mesogenic group (e.g., a rigid group that typically has a rod-like structure to facilitate formation of a liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different properties such as, for example, solubilities in solvent(s).

Suitable cholesteric liquid crystal polymers include polymers having a chiral or achiral polyamide, polyacrylate, or polymethacrylate backbone that include mesogenic groups optionally separated by rigid or flexible co-monomers. Other suitable cholesteric liquid crystal polymers have a polymer backbone (for example, a polyamide, polyacrylate, or polymethacrylate backbone) with chiral and achiral mesogenic side-chain groups. The side-chain groups are optionally separated from the backbone by a spacer, such as, for example, an alkylene or alkylene oxide spacer, to provide flexibility.

To form a cholesteric liquid crystal layer, a cholesteric liquid crystal composition can be coated or otherwise disposed onto a surface. The cholesteric liquid crystal composition includes a chiral component containing at least one (i) chiral compound, (ii) chiral monomer that can be used (e.g., polymerized or crosslinked) to form a cholesteric liquid crystal polymer, or (iii) a combination thereof. The cholesteric liquid crystal composition can also include a non-chiral component that contains at least one (i) nematic liquid crystal compound, (ii) nematic liquid crystal monomer that can be used to form a nematic liquid crystal polymer, or (iii) a combination thereof. Together with the chiral component, the nematic liquid crystal compound(s) or nematic liquid crystal monomers can be used to modify the pitch of the cholesteric liquid crystal composition. The cholesteric liquid crystal composition can also include one or more additives, such as, for example, curing agents, crosslinkers, antiozonants, antioxidants, plasticizers, stabilizers, and ultraviolet, infrared, or visible light-absorbing dyes and pigments.

Cholesteric liquid crystal compositions can also be formed using one, two, three, or more different types of any of the following: chiral compounds, achiral compounds, cholesteric liquid crystals, cholesteric liquid crystal monomers, nematic liquid crystals, nematic liquid crystal monomers, latent nematic or chiral nematic materials (in which the latent material exhibits the liquid crystal mesophase in combination with other materials), or combinations thereof. The particular ratio(s) by weight of materials in the cholesteric liquid crystal composition will generally determine, at least in part, the pitch of the cholesteric liquid crystal layer.

The cholesteric liquid crystal composition is generally part of a coating composition that may include a solvent(s). In some instances, one or more of the liquid crystals, liquid crystal monomers, processing additives, or any other component of the cholesteric liquid crystal composition may also act as a solvent. In some cases, the solvent can be substantially removed or eliminated from the coating composition by, for example, drying the composition to evaporate the solvent or reacting a portion of the solvent (e.g., reacting a solvating liquid crystal monomer to form a liquid crystal polymer) or by cooling below the processing temperature of the composition.

Reacting a thiol compound with the liquid crystal compound has been found to reduce the haze value of resulting cholesteric liquid crystal films. In some embodiments, the thiol compound is in a protected form (see Example 1 RAFT agent). In many embodiments, the thiol compound is an alkyl thiol. While not intending to be bound by any particular theory, aliphatic chain end may act as molecular lubricants, thus, facilitating alignment of the liquid crystal molecules/ segments during a thermal induced phase separation process, since aliphatic segments have lower melting temperatures. Thus, the thiol compound can aid in reducing a haze value measured haze value in the liquid crystal films (single layer, bi-layer, or tri-layer structures) described herein.

The thiol compound can assist in lowering a haze value of the resulting cholesteric liquid crystal layer. In some embodiments, the cholesteric liquid crystal layer has a haze value in a range from 0 to 5% (less than 5%), or from 0 to 4% (less than 4%), or from 0 to 3% (less than 3%), or from 0 to 2% (less than 2%), or from 0 to 1% (less than 1%). In other embodiments, the cholesteric liquid crystal layer disposed on a substrate has a total (or combined) haze value in a range from 0 to 5% (less than 5%), or from 0 to 4% (less than 4%), or from 0 to 3% (less than 3%), or from 0 to 2% (less than 2%), or from 0 to 1% (less than 1%).

The "haze" value of an optical body can be determined from the percentage of light which, in passing through the body, deviates from the incident beam through forward scatter by more than a specified average degree. ASTM D1003 provides a method for making such a measurement.

The thiol compound includes one or more pendent thiol moieties attached to an organic moiety. The organic moiety may include a linear, branched or cyclic hydrocarbon structure that may contain one or more heteroatomic substitutions that do not interfere with the specified function of the composition. Substituents include alkoxy, hydroxy, mercapto, amino, alkyl substituted amino, or halo, for example.

In some embodiments the thiol compound is a linear or branched ($C_1$-$C_{18}$)alkyl thiol, or a linear or branched ($C_6$-$C_{12}$) alkyl thiol. In one embodiment, the thiol is $C(CH_2OOCCH_2CH_2SH)_4$. In some embodiments, the thiol compound is $CH_3(CH_2)_5SH$, $CH_3(CH_2)_6SH$, $CH_3(CH_2)_7SH$, $CH_3(CH_2)_8SH$, $CH_3(CH_2)_9SH$, $CH_3(CH_2)_{10}SH$, $CH_3(CH_2)_{11}SH$, or $HO(CH_2)_{11}SH$.

In many embodiments, cholesteric liquid crystal polymers are formed by reacting cholesteric liquid crystal compositions with from about 0.1 to 35%, 1 to 20%, or 1 to 10% of one or more thiol compounds by weight of the total solids content of the polymer.

After coating, the cholesteric liquid crystal composition or polymers are converted into a liquid crystal layer or material. This conversion can be accomplished by a variety of techniques including evaporation of a solvent; heating; crosslinking the cholesteric liquid crystal composition; or curing or polymerizing the cholesteric liquid crystal composition using, for example, heat, radiation (e.g., actinic radiation), light (e.g., ultraviolet, visible, or infrared light), an electron beam, or a combination of these or like techniques.

As a result of the coating and conversion to cholesteric liquid crystal materials, a cholesteric liquid crystal layer that is effective over a wide range of wavelengths can be produced, if desired. In some embodiments, the cholesteric liquid crystal layer substantially reflects light over a spectral width of at least 100, 150, 200, 300, 400, 500 or 600 nm or more measured as full width at half peak height of the reflection spectrum.

Optionally, initiators can be included within the cholesteric liquid crystal composition to initiate polymerization or crosslinking of monomeric components of the composition. Examples of suitable initiators include those that can generate free radicals to initiate and propagate polymerization or crosslinking. Free radical generators can also be chosen according to stability or half-life. Preferably the free radical initiator does not generate any additional color in the cholesteric liquid crystal layer by absorption or other means. Examples of suitable free radical initiators include thermal free radical initiators and photoinitiators. Thermal free radical initiators include, for example peroxides, persulfates, or azonitrile compounds. These free radical initiators generate free radicals upon thermal decomposition.

Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

An aligned cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with rayon or other cloth.

Photoalignment orientated substrates are described in U.S. Pat. Nos. 4,974,941, 5,032,009, 5,389,698, 5,602,661, 5,838,407, and 5,958,293. After deposition, the cholesteric liquid crystal composition is heated above the glass transition temperature of the composition to the liquid crystal phase. The composition can be cooled into a glassy state and the composition remains in the liquid crystal phase. Alternatively or in addition, the composition can be photoset while in the liquid crystal phase.

Optical bodies can be formed by disposing at least one cholesteric liquid crystal material on a substrate. The surface of the substrate (e.g., the surface of an alignment layer provided as part of the substrate) has a surface alignment feature that can improve or provide uniformity of alignment of the cholesteric liquid crystal material disposed thereon. A surface alignment includes any surface features that produce alignment of the director of the liquid crystal material at that surface. Surface alignment features can be produced by a variety of different methods including, for example, unidirectional rubbing of the substrate, stretching the substrate, or photoalignment of a photopolymerizable material by light, among others.

The substrate can provide a base for deposition or formation of an optical body or structure including the various cholesteric liquid crystal compounds. The substrate can be a structural support member during manufacture, use, or both. The substrate may be at least partially transparent over the wavelength range of operation of the optical body such as, for example, the visible light spectrum (from 425 nm to 750 nm).

The optical bodies can be combined with other optical or physical elements. In one embodiment, a visible light transparent polymeric film can be disposed between an light reflecting cholesteric liquid crystal layer and a pressure sensitive adhesive layer. This construction can be adhered to an optical body such as, for example, a glass substrate.

The pressure sensitive adhesive (PSA) layer described above can any type of adhesive that enables the light reflecting cholesteric liquid crystal layer to be affixed to another optical body such as, for example, glass. Ultra-violet absorption additives can be incorporated into the PSA. In many embodiments, the PSA is an optically clear PSA film such as a polyacrylate pressure sensitive adhesive. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth) acrylate-(e.g., acrylate and methacrylate) based polymers. Of these, (meth)acrylate-based polymer PSAs have evolved as a preferred class of PSA for the present invention due to their optical clarity, permanence of properties over time (aging stability), and versatility of adhesion levels, to name just a few of their benefits.

A release liner can be disposed on the PSA. The release liner can be formed of any useful material such as, for example, polymers or paper and may include a release coat. Suitable materials for use in release coats include, but are not limited to, fluoropolymers, acrylics and silicones designed to facilitate the release of the release liner from the adhesive.

To make a cholesteric liquid crystal layer capable of reflecting a broad range of wavelengths, multiple pitch lengths can be used. Broadband cholesteric liquid crystal polarizers can be formed by laminating or otherwise stacking two separately-formed cholesteric liquid crystal coatings, each disposed on an individual substrate, with different pitches (e.g., having different compositions, for example, different ratios by weight of chiral and nematic liquid crystal components). Each layer has a different pitch and, therefore, reflects light having a different wavelength.

With a sufficient number of layers, an article can be constructed that reflects a large portion of the light spectrum. These constructions tend to have a non-uniform transmission or reflection spectra because each layer reflects a different region of light. The uniformity can be improved somewhat by allowing some diffusion of the liquid crystals between the various layers during construction. These layers can be heated to diffuse some liquid crystal material between the layers. This can result in an averaging of the pitches between the various layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers which are typically polymeric in nature.

Techniques for making multi-layer cholesteric liquid crystal optical bodies have been developed. These techniques include solvent and material selection to facilitate forming two, three, or more cholesteric liquid crystal layers on a substrate from a single coating mixture.

In one illustrative embodiment, a method of forming cholesteric liquid crystal bodies includes forming two or more cholesteric liquid crystal layers from a single coating mixture, each of the cholesteric liquid crystal layers can have different optical properties. The coating mixture can include a first cholesteric liquid crystal composition, a second cholesteric liquid crystal composition, and a solvent. After coating a substrate with the coating mixture, a first layer and a second layer can be formed on the substrate from the single coating mixture. The single coating mixture includes one or more solvent(s) and two, or more cholesteric liquid crystal compositions that are at least partly soluble in the solvent(s). Useful compositions and methods describing cholesteric liquid crystal bi-layer constructions are described in U.S. 2004-0165140, which is incorporated by reference herein.

In another illustrative embodiment, a method of forming cholesteric liquid crystal bodies includes forming three or more cholesteric liquid crystal layers from a single coating mixture, each of the cholesteric liquid crystal layers can have different optical properties. The coating mixture can include a first cholesteric liquid crystal composition, a second cholesteric liquid crystal composition, and a solvent. After coating a substrate with the coating mixture, a first, second, and third layer can be formed on the substrate. The single coating mixture includes one or more solvent(s) and two, three, or more cholesteric liquid crystal compositions that are at least partly soluble in the solvent(s). Useful compositions and methods describing cholesteric liquid crystal bi-layer constructions are described in U.S. patent application Ser. No. 10/858,238, which is incorporated by reference herein.

These methods can form one, two, three or more cholesteric liquid crystal layers with different optical properties. Optical properties that can differ include, for example, pitch which can include effective pitch ($[n_e+n_o]/2 \times p$), and handedness.

In one embodiment, the mixture includes a first liquid crystal polymer, a second cholesteric liquid crystal monomer, and a second cholesteric liquid crystal polymer that is optionally formed from a portion of the second cholesteric liquid crystal monomer. The first cholesteric liquid crystal polymer and the second cholesteric liquid crystal polymer are different and have at least some level of incompatibility.

The second cholesteric liquid crystal polymer can be present in the mixture prior to coating the coating mixture onto the substrate. Alternatively or in addition, the second cholesteric liquid crystal polymer can be formed from the second cholesteric liquid crystal monomer after the coating mixture is coated onto the substrate. As solvent is removed from the coating mixture the first cholesteric liquid crystal polymer and the second cholesteric liquid crystal monomer at least partially separate into layers. In one embodiment, the first cholesteric liquid crystal polymer forms a layer adjacent the substrate and the second cholesteric liquid crystal monomer forms a layer on the first cholesteric liquid crystal polymer, generating a bi-layer structure on the substrate. The first layer, which can be adjacent to the substrate, includes a majority of the first cholesteric liquid crystal polymer. The second layer, which can be disposed on the first layer, includes a majority of the second cholesteric liquid crystal monomer. The cholesteric liquid crystal material in this structure can then be heated to form an aligned optical body. This aligned optical body can then be fully cured to form a fully cured optical body.

In some embodiments, a tri-layer construction can then be formed from the bi-layer structure by partial curing such that the physical properties of one or more of the second liquid crystal monomer, first liquid crystal polymer, and the second liquid crystal polymer are altered resulting in at least a portion of the second liquid crystal polymer migrating to a position between the second liquid crystal monomer layer and the first liquid crystal polymer layer. For example, by heating the bi-layer structure or at least partially curing the bi-layer structure with U.V. radiation, the solubility of the second liquid crystal monomer in the second liquid crystal polymer may be decreased causing the second liquid crystal monomer to at least partially separate from the second liquid crystal polymer to form a tri-layer structure. In this example, an optical body includes a first layer, a second layer, and a third layer disposed between the first and second layers. The first layer, which can be adjacent to the substrate, includes a majority of the first cholesteric liquid crystal polymer. The second layer includes a majority of the second cholesteric liquid crystal monomer. The third layer includes the second cholesteric liquid crystal polymer. This cholesteric liquid crystal material in this structure can then be heated to form an aligned optical body. This aligned optical body can then be fully cured to form a fully cured optical body.

The coating mixture can additionally include a reactive monomer material to crosslink, in addition to polymerize. This reactive monomer material may be a reactive monomer and, in some embodiments is a cholesteric liquid crystal compound, a precursor for a cholesteric liquid crystal polymer, or a chiral compound. For example, the reactive monomer material can be, for example, a di(meth)acrylate, an epoxy-acrylate, a diepoxide, a divinyl, a diallyl ether or other reactive material. This reactive monomer "sets" or "fixes" the cholesteric liquid crystal layer(s) and prevents or substantially reduces any movement of material within the layer(s) over time.

The methods described above can be performed using a variety of techniques and equipment. As described herein, a "layer" will be understood to include a single physical thickness or a single optical thickness. A single physical thickness can include a distinct boundary layer as shown in the figures or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients.

The light reflecting articles can be disposed adjacent to or coupled with an optical substrate. Optical substrates can be formed of any useful material. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments, the visible light transparent substrate is a half wave PET retarder film. In one embodiment, the visible light transparent substrate has a thickness from 5 to 25 micrometers.

EXAMPLES

All chemical disclosed below are commercially available from Aldrich Chemical Company, unless otherwise noted.

Example 1

Synthesis of RAFT Agent

A 250 mL round-bottom dry flask with a stir bar was charged with tetrahydrofuran (27.83 mL), carbon disulfide (5.02 mL), and 1-dodecanethiol (10 mL). The solution was cooled to 0° C. in an ice bath and triethyl amine (8.73 mL) was added dropwise. The solution turned yellow and was allowed to stir at 0° C. for 10 min and at room temperature for another 60 min (orange solution). The solution was cooled back to 0° C. in an ice bath and 2-bromopropanoic acid (3.8 mL) was added slowly. The orange solution turned yellow with white precipitate. The mixture was stirred at room temperature overnight and the white precipitate was filtered and washed with ethyl acetate. The filtrate was poured into a stirred aqueous HCl (1.0 N, 50 mL) solution. The orange organic layer was separated and washed with aqueous saturated sodium chloride (50 mL), dried over magnesium sulfate, filtered and concentrated under reduced pressure to yield a yellow solid. Hexane (90 mL) was added and the mixture was heated to form a homogeneous solution. The solution was recrystallized in a freezer to afford S-n-dodecyl-S'-(2-methylpropanoic acid)-trithiocarbonate as short yellow needles.

Liquid Crystal (LC) Polymer Synthesis and Coating Formation

4-Cyanobiphenyl benzoate ethyl acrylate (9.54 g, C2 monomer) and dioxolane (26.79 g) were introduced into jar containing a magnetic stir bar. After the mixture was degassed for about 2 min with controlled nitrogen flow, the jar was sealed with tape, and placed into 130° C. oil bath, and stirred. After the monomer was fully dissolved, removed the jar from oil bath, let cool for a few minutes, and added the LC756 (0.36 g, Paliocolor, BASF), RAFT agent (0.34 g), and Vazo 67 (0.018 g, Du Pont). The jar was resealed and put it back into oil bath. After the solution became clear again, the clear solution was placed into an oven at 65° C. for 24 hours. Then, Vazo 52 (0.018 g, Du Pont ) was added and kept in the oven at 65° C. for another 24 hours to afford LC polymer having number-averaged molecular weight of 5500 g/mol. (polydispersity: 1.8, GPC results with polystyrene as internal standard).

Preparation of the C2 monomer is described in European Patent Application Publication No. 834754, which is incorporated herein by reference. The structure of 4-cyanobiphenyl benzoate ethyl acrylate is:

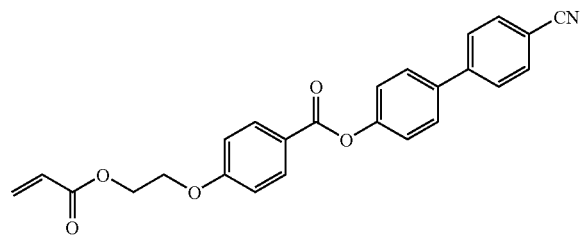

Compound LC 756 (Paliocolor™ LC 756 is commercially available from BASF) and Compound LC 242 (Paliocolor™ LC 242) are liquid crystal monomers available from BASF Corp. (Ludwigshafen, Germany). Vazo™ 52 and Vazo™ 67 (DuPont, Wilmington, Del.) are thermally decomposable substituted azonitrile compounds used as a free radical initiators. This LC polymer solution (5.29 g) was combined with a LC 242 monomer solution (7.54 g, Paliocolor, BASF) prepared with the following formulation:

| LC monomer solution | |
|---|---|
| Chemicals | Weight (g) |
| LC756 | 0.34 |
| LC242 | 10.97 |
| BHT | 0.18 |
| Irgacure907 | 0.18 |
| Benzyl Al | 0.88 |
| 10% Byk361 | 3 drops |
| CHO | 8.80 |
| Dioxolane | 14.03 |
| HOCB | 2.50 |
| Total: | 37.88 |
| Solid content | 37.40% |

Where, BHT refers to 2,6-Di-tert-butyl-4-methyl phenol (96%, Aldrich), Irgacure 907 is a photoinitiator (Ciba), CHO is cyclohexanone (Aldrich), HOCB: 4-Cyano 4'-hydroxybiphenyl (TCI), 10% Byk361 is a commercial surfactant available from BYK Chemie, Wallingford, Conn., and Benzyl Al is benzyl alcohol.

After mixing this combined solution and filtering through a 0.45 um filter, it was coated on PET film (3M Scotchpak) using a wire-wound rod (number 10) to give a bi-layer liquid crystal coating of 6 micron dried thickness. The coating was air dried for about 15 second and then heated in a 120° C. oven for 5 minutes. Upon photocuring in a Fusion processor (Model: DRS-120, D-bulb, Fusion System Inc.) in air with a line speed of 20 FPM, a highly transparent, non-sticky LC coating was obtained with a low level of haze: 1.6%. Spectra measurement from 300 nm to 2500 nm on a Perkin Elmer spectrometer showed two distinctive reflecting bands covered from 830 nm to 1280 nm spectra region, a desired reflecting region for solar control films.

Example 2

A liquid crystal (LC) polymer was prepared following similar procedures described in Example 1 using the following composition and condition:

| Chemicals | Actual Weight (g) |
|---|---|
| C2 monomer | 14.33 |
| LC756 | 0.54 |
| Dioxolane | 37.2 |
| Vazo 52 | 0.028 |
| $C_{12}H_{25}SH$ | 0.25 |
| Total: | 52.35 |
| Solid content | 28.93% |
| Conditions | 60° C./18 h |

This LC polymer solution (5.29 g) was combined with a LC 242 monomer solution (7.54 g, same solution described in Example 1). Following the same procedure used in Example 1, a highly clear bi-layer LC film was obtained with a low haze of 1.6%.

Example 3

A liquid crystal (LC) polymer was prepared following similar procedures described in Example 1 using the following composition and condition:

| Chemicals | Actual Weight (g) |
|---|---|
| C2 monomer | 4.78 |
| LC756 | 0.18 |
| Dioxolane | 13.38 |
| Vazo 52 | 0.01 |
| $C(CH_2OOCCH_2CH_2SH)_4$ | 0.16 |
| Total: | 18.51 |
| Solid content | 27.72% |
| Condition | 60° C./18 h |

This LC polymer solution (5.37 g) was combined with a LC 242 monomer solution (7.55 g, same solution described in Example 1). Following the same procedure used in Example 1, a highly clear bi-layer LC film having a thickness of 5.0 um was obtained with the following optical properties:
Transparency: 90.6
Haze: 0.53
Clarity: 98.8

Example 4

A liquid crystal LC polymer was prepared following the similar procedures described in Example 1 using the following composition and condition:

| Chemicals | Actual Weight (g) |
|---|---|
| C2 monomer | 4.77 |
| LC756 | 0.18 |
| Dioxolane | 13.38 |
| Vazo 52 | 0.01 |
| $CH_3(CH_2)_5SH$ | 0.04 |
| Total: | 18.38 |

-continued

| Chemicals | Actual Weight (g) |
|---|---|
| Solid content | 27.20% |
| Condition | 60° C./18 h |

This LC polymer solution (5.27 g) was combined with a LC 242 monomer solution (7.55 g, same solution described in Example 1). Following the same procedure used in Example 1, a highly clear bi-layer LC film having a thickness of 4.90 um was obtained with the following optical properties:
Transparency: 90.5
Haze: 1.19
Clarity: 98.7

Example 5

A LC polymer was prepared following similar procedures described in Example 1 using the following composition and condition:

| Chemicals | Actual Weight (g) |
|---|---|
| C2 monomer | 4.79 |
| LC756 | 0.18 |
| Dioxolane | 13.44 |
| Vazo 52 | 0.01 |
| $CH_3(CH_2)_7SH$ | 0.09 |
| Total: | 18.50 |
| Solid content | 27.37% |
| Condition | 60° C./18 h |

This LC polymer solution (5.29 g) was combined with a LC 242 monomer solution (7.54 g, same solution described in Example 1). Following the same procedure used in Example 1, a highly clear bi-layer LC film having a thickness of 5.20 um was obtained with the following optical properties:
Transparency: 90.4
Haze: 1.05
Clarity: 98.5

Example 6

A LC polymer was prepared following similar procedures described in Example 1 using the following composition and condition except that 1.0 g of THF was used to dissolve the mixture of LC756, Vazo 52 and 11-mercapto-1-undecanol:

| Chemicals | Actual Weight (g) |
|---|---|
| C2 monomer | 2.39 |
| LC756 | 0.10 |
| Dioxolane | 5.70 |
| Vazo 52 | 0.005 |
| $HO(CH_2)_{11}SH$ | 0.06 |
| THF | 1.00 |
| Total | 9.25 |
| Solid Content | 27.58% |
| Condition | 60° C./18 h |

This LC polymer solution (2.64 g) was combined with the LC monomer solution (3.77 g same LC monomer solution described in Example 1). Following the same procedure used in Example 1, a clear bi-layer LC film with a thickness of 5.20 micrometers was obtained with the following optical properties:
Transparency: 90.9
Haze: 1.07
Clarity: 99.7

Example 7

Single Layer LC Film

A LC polymer was prepared following the similar procedures described in Example 1 using the following composition and condition:

| Chemicals | Actual Weight (g) |
|---|---|
| C2 monomer | 4.77 |
| LC756 | 0.18 |
| Dioxolane | 13.38 |
| Vazo 52 | 0.01 |
| Total | 18.34 |
| Solid Content | 27.04% |
| Condition | 60° C./18 h |

This LC polymer solution (4.81 g) was combined with the additives HOCB (0.12 g) and CHO (1.39 g) as well as additional Dioxolane (3.90 g). Following the same procedure used in Example 1, a clear LC film (without thiol) having a thickness of 2.12 micrometers was obtained with the following optical properties:
Transparency: 89.1
Haze: 4.02
Clarity: 99.5

Example 8

Single Layer Film Made from Thiol-Involved C2 Polymer

LC polymer was prepared following the similar procedures described in Example 1 using the following composition and condition:

| Chemicals | Actual Weight (g) |
|---|---|
| C2 monomer | 4.76 |
| LC756 | 0.19 |
| Dioxolane | 13.41 |
| $C_{12}H_{25}SH$ | 0.08 |
| Vazo 52 | 0.01 |
| Total | 18.45 |
| Solid Content | 27.32% |
| Condition | 60° C./18 h |

This LC polymer solution (2.40 g) was combined with the additives HOCB (0.06 g) and CHO (0.71 g) as well as additional Dioxolane (1.94 g). Following the same procedure used in Example 1, a highly clear LC film having a thickness of 2.31 micrometers was obtained with the following optical properties:
Transparency: 89.1
Haze: 3.30
Clarity: 99.3

Example 9

Control Example of Bilayered LC Film

LC polymer was prepared following the similar procedures described in Example 1 using the following composition and condition:

| Chemicals | Actual Weight (g) |
|---|---|
| C2 monomer | 4.77 |
| LC756 | 0.18 |
| Dioxolane | 13.38 |
| Vazo 52 | 0.01 |
| Total | 18.34 |
| Solid Content | 27.04% |
| Condition | 60° C./18 h |

The LC polymer solution (5.29 g) was combined with an LC 242 monomer solution (7.55 g, same solution described in Example 1). Following the same procedure used in Example 1, an bilayer LC film (without thiol) having a top layer thickness of 3.20 micrometers and a bottom layer thickness of 2.39 micrometers was obtained with the following optical properties:

Transparency: 89.9
Haze: 11.4
Clarity: 93.2

Example 10

Bilayered LC Film made from Direct Mixing with Thiol (n-$C_{12}H_{25}SH$)

To the combined solution (6.00 g) described in Example 9 was added 1-dodecanethiol (0.02 g). The mixture was well mixed in an orbital shaker. Following the same procedure used in Example 1, a bilayer LC film having a having a top layer thickness of 3.12 micrometers and a bottom layer thickness of 2.35 micrometers was obtained with the following optical properties:

Transparency: 89.8
Haze: 16.1
Clarity: 86.1

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the disclosure is to be limited only by the claims provided below.

The invention claimed is:

1. A cholesteric liquid crystal composition comprising:
   a reaction product of:
   a cholesteric liquid crystal compound of formula (I):

(I)

wherein,
   n is 1, 2, 3, or 4;
   R is an acrylate, methacrylate, or acrylamide;
   $R_1$ is a ($C_1$-$C_8$) alkylene, ($C_2$-$C_8$) alkenylene, or ($C_2$-$C_8$) alkylyne;
   $R_2$ is a bond, —O—, —C(O)O—, —O(O)C—, —OC(O)O—, —C(O)N—, —CH=N—, —N=CH—, or —NC(O)—;
   $R_3$ is a cycloalkylene, cycloalkenylene, heterocyclylene, arylene, or hetroarylene;
   $R_4$ is a bond, ($C_1$-$C_8$) alkylene, ($C_2$-$C_8$) alkenylene, ($C_2$-$C_8$) alkylyne, carbonyl, —O—, —C(O)O—, —O(O)C—, —OC(O)O—, —C(O)N—, —CH=N—, —N=CH—, or —NC(O)—;
   $R_3$ and $R_4$ are independently selected for each n;
   $R_5$ is a bond, cycloalkylene, cycloalkenylene, hetrocyclylene, arylene, or hetroarylene;
   $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$;
   and
   a thiol compound.

2. A composition according to claim 1 wherein the thiol compound comprises a ($C_1$-$C_{18}$)alkyl thiol.

3. A composition according to claim 1 wherein the thiol compound comprises a ($C_6$-$C_{12}$)alkyl thiol.

4. A composition according to claim 1 wherein the a cholesteric liquid crystal compound of formula (I) comprises n being 1 or 2; R is an acrylate or methacrylate, $R_1$ is a ($C_1$-$C_6$) alkylene; $R_2$ is a bond or —O—; $R_3$ is an arylene or hetroarylene; $R_4$ is a bond, ($C_1$-$C_8$) alkylene, —O—, —C(O)O—, —O(O)C—, —OC(O)O—, —C(O)N—; $R_3$ and $R_4$ are independently selected for each n; $R_5$ is a bond, arylene, or hetroarylene; and $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

5. A composition according to claim 1 wherein the thiol compound is $CH_3(CH_2)_5SH$, $CH_3(CH_2)_6SH$, $CH_3(CH_2)_7SH$, $CH_3(CH_2)_8SH$, $CH_3(CH_2)_9SH$, $CH_3(CH_2)_{10}SH$, $CH_3(CH_2)_{11}SH$, or $HO(CH_2)_{11}SH$.

6. The composition according to claim 1, wherein the cholesteric liquid crystal compound comprises a chiral molecular unit and an achiral molecular unit of formula (I) wherein the achiral molecular unit is a compound of formula (C2):

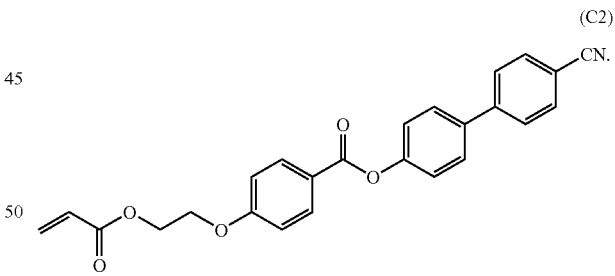

(C2)

7. A method of forming a cholesteric liquid crystal film comprising:
   reacting a cholesteric liquid crystal compound and a thiol compound to form a cholesteric liquid crystal polymer wherein the cholesteric liquid crystal compound comprises a compound of formula (I):

(I)

wherein,
   n is 1, 2, 3, or 4;
   R is an acrylate, methacrylate, or acrylamide;
   $R_1$ is a ($C_1$-$C_8$) alkylene, ($C_2$-$C_8$) alkenylene, or ($C_2$-$C_8$) alkylyne;

$R_2$ is a bond, —O—, —C(O)O—, —O(O)C—, —OC(O)O—, —C(O)N—, —CH=N—, —N=CH—, or —NC(O)—;

$R_3$ is a cycloalkylene, cycloalkenylene, heterocyclylene, arylene, or hetroarylene;

$R_4$ is a bond, $(C_1\text{-}C_8)$ alkylene, $(C_2\text{-}C_8)$ alkenylene, $(C_2\text{-}C_8)$ alkylyne, carbonyl, —O—, —C(O)O—, —O(O)C—, —OC(O)O—, —C(O)N—, —CH=N—, —N=CH—, or —NC(O)—;

$R_3$ and $R_4$ are independently selected for each n;

$R_5$ is a bond, cycloalkylene, cycloalkenylene, hetrocyclylene, arylene, or hetroarylene; and $R_6$ is hydrogen, cyano, halo, $(C_1\text{-}C_8)$ alkoxy, $(C_1\text{-}C_8)$ alkyl, nitro, amino, carboxy, $(C_1\text{-}C_4)$thioalkyl, $COCH_3$, $CF_3$, $OCF_3$, or $SCF_3$;

disposing the cholesteric liquid crystal polymer on a substrate; and aligning the cholesteric liquid crystal polymer to form an aligned cholesteric liquid crystal film.

8. A method according to claim 7 wherein the reacting step comprises reacting a cholesteric liquid crystal compound comprising a chiral molecular unit and an achiral molecular unit of formula (I), the achiral molecular unit is a compound of formula (C2):

(C2)

9. A method according to claim 7 wherein the reacting step comprises reacting a cholesteric liquid crystal compound and a thiol compound of a formula $CH_3(CH_2)_5SH$, $CH_3(CH_2)_6SH$, $CH_3(CH_2)_7SH$, $CH_3(CH_2)_8SH$, $CH_3(CH_2)_9SH$, $CH_3(CH_2)_{10}SH$, $CH_3(CH_2)_{11}SH$, or $HO(CH_2)_{11}SH$.

10. A method according to claim 7 wherein the aligning step forms a cholesteric liquid crystal film having a haze value lower than the cholesteric liquid crystal film without the thiol compound.

11. A method according to claim 7 wherein the aligning step forms a cholesteric liquid crystal film having a haze value less than 5%.

12. A method according to claim 7 wherein the aligning step forms a cholesteric liquid crystal film having a haze value less than 3%.

13. A method according to claim 7 wherein the aligning step forms a cholesteric liquid crystal film having a haze value less than 1%.

14. A cholesteric liquid crystal film comprising:

a visible light transparent substrate comprising a polymer; and a cholesteric liquid crystal layer disposed on the substrate, wherein the substrate and cholesteric liquid crystal layer have a combined haze value of less than 4% and the cholesteric liquid crystal layer comprises:

a reaction product of:

a cholesteric liquid crystal compound of formula (I):

$$R\text{—}R_1\text{—}R_2\text{—}(R_3R_4)_n R_5\text{—}R_6 \qquad (I)$$

wherein, n is 1, 2, 3, or 4;

R is an acrylate, methacrylate, or acrylamide;

$R_1$ is a $(C_1\text{-}C_8)$ alkylene, $(C_2\text{-}C_8)$ alkenylene, or $(C_2\text{-}C_8)$ alkylyne;

$R_2$ is a bond, —O—, —C(O)O—, —O(O)C—, —OC(O)O—, —C(O)N—, —CH=N—, —N=CH—, or —NC(O)—;

$R_3$ is a cycloalkylene, cycloalkenylene, heterocyclylene, arylene, or hetroarylene;

$R_4$ is a bond, $(C_1\text{-}C_8)$ alkylene, $(C_2\text{-}C_8)$ alkenylene, $(C_2\text{-}C_8)$ alkylyne, carbonyl, —O—, —C(O)O—, —O(O)C—, —OC(O)O—, —C(O)N—, —CH=N—, —N=CH—, or —NC(O)—;

$R_3$ and $R_4$ are independently selected for each n;

$R_5$ is a bond, cycloalkylene, cycloalkenylene, hetrocyclylene, arylene, or hetroarylene;

$R_6$ is hydrogen, cyano, halo, $(C_1\text{-}C_8)$ alkoxy, $(C_1\text{-}C_8)$ alkyl, nitro, amino, carboxy, $(C_1\text{-}C_4)$thioalkyl, $COCH_3$, $CF_3$, $OCF_3$, or $SCF_3$; and a thiol compound.

15. A cholesteric liquid crystal film according to claim 14 wherein the thiol compound comprises a $(C_1\text{-}C_{18})$alkyl thiol.

16. A cholesteric liquid crystal film according to claim 14 wherein the cholesteric liquid crystal compound of formula (I) comprises n being 1 or 2; R is an acrylate or methacrylate, $R_1$ is a $(C_1\text{-}C_6)$ alkylene; $R_2$ is a bond or —O—; $R_3$ is an arylene or hetroarylene; $R_4$ is a bond, $(C_1\text{-}C_8)$ alkylene, —O—, —C(O)O—, —O(O)C—, —OC(O)O—, —C(O)N—; $R_3$ and $R_4$ are independently selected for each n; $R_5$ is a bond, arylene, or hetroarylene; and $R_6$ is hydrogen, cyano, halo, $(C_1\text{-}C_8)$ alkoxy, $(C_1\text{-}C_8)$ alkyl, nitro, amino, carboxy, $(C_1\text{-}C_4)$thioalkyl, $COCH_3$, $CF_3$, $OCF_3$, or $SCF_3$.

17. A cholesteric liquid crystal film according to claim 14 wherein the cholesteric liquid crystal film has a haze value less than 3%.

18. A cholesteric liquid crystal film according to claim 14 further comprising a pressure sensitive adhesive disposed on the visible light transparent substrate.

19. A cholesteric liquid crystal film according to claim 14 wherein the thiol compound is $CH_3(CH_2)_5SH$, $CH_3(CH_2)_6SH$, $CH_3(CH_2)_7SH$, $CH_3(CH_2)_8SH$, $CH_3(CH_2)_9SH$, $CH_3(CH_2)_{10}SH$, $CH_3(CH_2)_{11}SH$, or $HO(CH_2)_{11}SH$.

20. The cholesteric liquid crystal film according to claim 14, wherein the cholesteric liquid crystal compound comprises a chiral molecular unit and an achiral molecular unit wherein the achiral molecular unit is a compound of formula (C2):

(C2)

* * * * *

UNITED STATES PATENT AND TRADEMARK OFFICE
CERTIFICATE OF CORRECTION

PATENT NO.         : 7,439,000 B2
APPLICATION NO. : 11/257844
DATED              : October 21, 2008
INVENTOR(S)        : Feng Bai Page 1 of 1

It is certified that error appears in the above-identified patent and that said Letters Patent is hereby corrected as shown below:

Column 2
Line 56, After "gradients" insert -- . --.

Column 4
Line 24, After "one" insert -- carbon --.

Column 5
Line 25, Delete ""heterocydylene"" and insert -- "heterocyclylene" --, therefor.

Column 20
Line 23, In Claim 4, delete "a" after "the".

Signed and Sealed this

Thirtieth Day of June, 2009

JOHN DOLL
*Acting Director of the United States Patent and Trademark Office*